(12) United States Patent
Lee et al.

(10) Patent No.: US 9,882,180 B2
(45) Date of Patent: Jan. 30, 2018

(54) POUCH CASE INCLUDING INTERNAL, INTERMEDIATE AND EXTERNAL RESIN LAYERS AND SECONDARY BATTERY INCLUDING THE SAME

(71) Applicant: LG CHEM, LTD., Seoul (KR)

(72) Inventors: Shin Hwa Lee, Daejeon (KR); Woo Yong Lee, Daejeon (KR); Jeoung Hwan Kim, Daejeon (KR); Min Su Kim, Daejeon (KR); Hyang Mok Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 475 days.

(21) Appl. No.: 14/413,339

(22) PCT Filed: Sep. 3, 2014

(86) PCT No.: PCT/KR2014/008273
§ 371 (c)(1),
(2) Date: Jan. 7, 2015

(87) PCT Pub. No.: WO2015/034263
PCT Pub. Date: Mar. 12, 2015

(65) Prior Publication Data
US 2016/0133882 A1    May 12, 2016

(30) Foreign Application Priority Data
Sep. 3, 2013 (KR) .................. 10-2013-0105415

(51) Int. Cl.
*H01M 2/02* (2006.01)
*H01M 10/04* (2006.01)
(Continued)

(52) U.S. Cl.
CPC ....... *H01M 2/0287* (2013.01); *H01M 2/0202* (2013.01); *H01M 2/026* (2013.01);
(Continued)

(58) Field of Classification Search
CPC .. H01M 2/026; H01M 2/0287; H01M 2/0202; H01M 2/0237; H01M 2/029; H01M 10/0525
(Continued)

(56) References Cited

U.S. PATENT DOCUMENTS

| 5,691,047 A | 11/1997 | Kurauchi et al. |
| 2008/0050651 A1 | 2/2008 | Wakai et al. |
| 2012/0015226 A1 | 1/2012 | Kim et al. |

FOREIGN PATENT DOCUMENTS

| EP | 0682376 A1 | 11/1995 |
| JP | 61-240564 A | 10/1986 |

(Continued)

OTHER PUBLICATIONS

Kim Min Su, Machine translation of KR 20100071634 A, Jun. 2010.*
(Continued)

*Primary Examiner* — Sean P Cullen
(74) *Attorney, Agent, or Firm* — Birch, Stewart, Kolasch & Birch, LLP

(57) ABSTRACT

Provided are a pouch case of a battery and a secondary battery including the same. Specifically, the present invention relates to a pouch case of a battery, which is formed by stacking an internal resin layer, an intermediate resin layer, and an external resin layer, and a pouch-type secondary battery including the same.

11 Claims, 3 Drawing Sheets

(51) Int. Cl.
*H01M 10/0525* (2010.01)
*H01M 10/052* (2010.01)

(52) U.S. Cl.
CPC ......... *H01M 2/029* (2013.01); *H01M 2/0237* (2013.01); *H01M 10/0525* (2013.01); *H01M 10/052* (2013.01); *H01M 2220/30* (2013.01)

(58) Field of Classification Search
USPC ................................................ 429/163, 176
See application file for complete search history.

(56) References Cited

FOREIGN PATENT DOCUMENTS

| | | | |
|---|---|---|---|
| JP | 2-123661 A | | 5/1990 |
| JP | 9-199178 A | | 7/1997 |
| JP | 9-259840 A | | 10/1997 |
| JP | 11-191400 A | | 7/1999 |
| JP | 2007056180 A | * | 3/2007 |
| JP | 2009-241521 A | | 10/2009 |
| JP | 5074041 B2 | | 11/2012 |
| JP | 2014-49308 A | | 3/2014 |
| KR | 10-2005-0100448 A | | 10/2005 |
| KR | 20090092108 A | * | 8/2009 |
| KR | 10-2009-0105496 A | | 10/2009 |
| KR | 10-2010-0071634 A | | 6/2010 |
| WO | WO 98/44574 A1 | | 10/1998 |
| WO | WO 2005/110746 A1 | | 11/2005 |

OTHER PUBLICATIONS

Lee Su Jin, Machine translation of KR 20090105496 A, Oct. 2009.*
Hayakawa, Seiichiro, Machine translation of JP 2007-056180 A, Mar. 2007.*
Seo Chang Ho, Machine translation of KR 2009-0092108 A, Aug. 2009.*
Extended European Search Report dated Apr. 23, 2015, for European Application No. 14815211.9.

* cited by examiner

POUCH CASE INCLUDING INTERNAL, INTERMEDIATE AND EXTERNAL RESIN LAYERS AND SECONDARY BATTERY INCLUDING THE SAME

CROSS-REFERENCE TO RELATED APPLICATIONS

This application is a National Phase of PCT International Application No. PCT/KR2014/008273, filed on Sep. 3, 2014, which claims priority under 35 U.S.C. 119 (a) to Korean Patent Application No. 10-2013-0105415 filed with Korean Intellectual Property Office on Sep. 3, 2013, the entire contents of which are incorporated herein by reference.

TECHNICAL FIELD

The present invention relates to a pouch case for a secondary battery and a pouch-type secondary battery including the same, and more particularly, to a multi-layered pouch case formed of internal resin layer/intermediate resin layer/external resin layer for preventing the degradation of the performance of a battery due to moisture penetration caused by corrosion of a pouch case during charge and discharge process and a pouch-type secondary battery including the same.

BACKGROUND ART

Recently, demand for secondary batteries as an energy source has been significantly increased as portable small electronic devices have been commercialized while realizing the miniaturization and weight reductions of electronic equipment. A lithium secondary battery exhibits two or more times higher discharge voltage and higher energy density than a typical battery using an alkaline aqueous solution by using an organic electrolyte solution.

A lithium secondary battery is prepared by using materials capable of intercalating and deintercalating lithium ions as an anode and a cathode, and charging an electrolyte solution between the cathode and the anode. Also, the lithium secondary battery generates electrical energy by oxidation and reduction reactions when lithium ions are intercalated and deintercalated in the cathode and the anode.

Lithium secondary batteries may be classified into lithium ion batteries using a liquid electrolyte solution and lithium-ion polymer batteries using a polymer solid electrolyte solution depending on the type of electrolyte solution. Also, depending on the type of the polymer solid electrolyte solution, the lithium-ion polymer batteries may be classified into full-solid type lithium ion polymer batteries, in which an electrolyte solution is not contained at all, and lithium-ion polymer batteries that use a gel-type polymer electrolyte solution containing an electrolyte solution.

With respect to the lithium ion batteries using a liquid electrolyte solution, a cylindrical or prismatic metal can container is generally used and sealed by welding. With respect to a prismatic lithium secondary battery, it is advantageous in protecting an electrode assembly from external impact and facilitating a liquid injection process. However, since the shape of the prismatic lithium secondary battery is fixed, it is difficult to reduce the volume thereof. Thus, with respect to electrical products using the prismatic lithium secondary battery as a power source, there are limitations in their design. Also, in terms of safety, since an effect of venting gas or liquid is not significant, internal heat and gas are accumulated. Thus, the risk of explosion may be high, and the time required to cause cell degradation may be short due to overheating because the internal heat is not effectively released.

In order to improve such limitations, pouch-type secondary batteries have recently been developed, in which the pouch-type secondary batteries are prepared by putting an electrode assembly, in which a cathode, an anode, and a separator are stacked and wound, in a pouch-type case formed of a film, injecting an electrolyte solution, and then sealing the pouch-type case.

As illustrated in FIG. 1, the pouch-type case is sequentially composed of an internal layer a acting as a sealant due to its sequential heat sealability, a metal layer b acting as a moisture and oxygen barrier layer while maintaining mechanical strength, and an external layer c acting as a protective layer. In this case, the internal layer a is formed in a multilayer structure in which a casted polypropylene (CPP) layer 11 commonly used as a polyolefin-based resin layer and a PPa layer 13 are stacked, the metal layer b is formed of a aluminum (Al) layer 15, and the external layer c is formed in a multilayer structure in which a polyethylene terephthalate (PET) layer 17 and a nylon layer 19 are stacked.

With respect to the pouch-type secondary battery, it has advantages in that there are no limitations in shape and size, assembly by thermal fusion is easy, and it has high safety because the effect of venting gas or liquid is facilitated when abnormal behaviors occur. Thus, the pouch-type secondary battery is particularly suitable for the preparation of a thin cell.

However, since the pouch-type secondary battery, different from the prismatic secondary battery, uses a soft pouch as a case, the case of the pouch-type secondary battery may have low physical and mechanical strength and may have low reliability of sealing.

For example, lithium hexafluorophosphate ($LiPF_6$) is included in the electrolyte solution used in the pouch-type secondary battery, wherein since the lithium hexafluorophosphate is decomposed into lithium (Li) and $PF_6$ during charge and discharge process to provide lithium ions to an electrolyte, it is used to increase the diffusion rate of lithium ions. However, since the lithium hexafluorophosphate has very good hydrophilicity, the lithium hexafluorophosphate reacts with moisture ($H_2O$) having a relative humidity of a few percent (%) that is included in air to form lithium hydroxide (LiOH) as well as hydrofluoric acid (HF) gas due to a reaction of $H^+$ with a single fluorine (F) atom of $PF_6$. The HF gas may increase the thickness of the pouch and may further cause the explosion.

In addition, since the metal layer b is exposed while the internal resin layer a is damaged due to internal stress during case forming to react with ions 23 of lithium salt that are dissolved in the electrolyte solution, a lithium-aluminum alloy 25 is formed on the surface of the metal layer b. The lithium-aluminum alloy 25 thus formed may further damage the pouch case while reacting with infiltrated moisture 27 to form HF gas and micropores. As a result, since HF gas increases while moisture penetration in the damaged pouch is facilitated, the dissolution of the Li—Al alloy becomes more intensified under strong acidic conditions. Therefore, the size of the pores is gradually increased 29. Eventually, this may cause the corrosion of the pouch case to result in the leakage of the electrolyte solution (see FIG. 2).

DISCLOSURE OF THE INVENTION

Technical Problem

The present invention provides a newly configured multilayer pouch case, which may prevent the corrosion of the pouch case during charge and discharge process for improving the electrical performance of a lithium secondary battery, and a pouch-type secondary battery including the same.

Technical Solution

According to an aspect of the present invention, there is provided a pouch case of a secondary battery, which is formed by stacking an internal resin layer, an intermediate resin layer, and an external resin layer.

In this case, the pouch case includes an acrylate-urethane-based resin or an epoxy-based resin as the intermediate resin layer.

According to another aspect of the present invention, there is provided a pouch-type secondary battery including: an electrode assembly; and the pouch case accommodating the electrode assembly.

Advantageous Effects

In the present invention, a corrosion phenomenon of a pouch may not only be prevented by providing a pouch case composed of an internal resin layer, an intermediate resin layer, and an external resin layer, but a pouch-type secondary battery having excellent stability may also be prepared by preventing moisture penetration due to the corrosion phenomenon.

MODE FOR CARRYING OUT THE INVENTION

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In a pouch case of a battery according to the present invention, provided is the pouch case which is formed by stacking an internal resin layer, an intermediate resin layer, and an external resin layer.

Also, in the present invention, provided is a pouch-type secondary battery which includes an electrode assembly; and the pouch case accommodating the electrode assembly.

Hereinafter, the present invention will be described in more detail with reference to the accompanying drawings.

Figure 1:
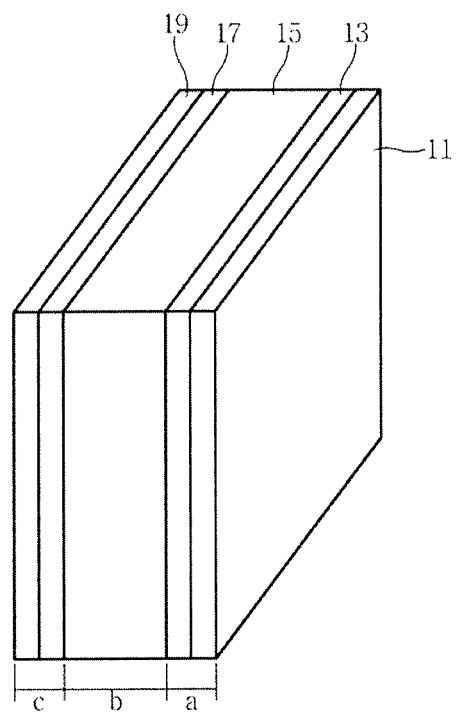
FIG. 1 is a cross-sectional view illustrating a typical pouch case composed of a multilayer structure of internal layer/metal layer/external layer.
Figure 2:
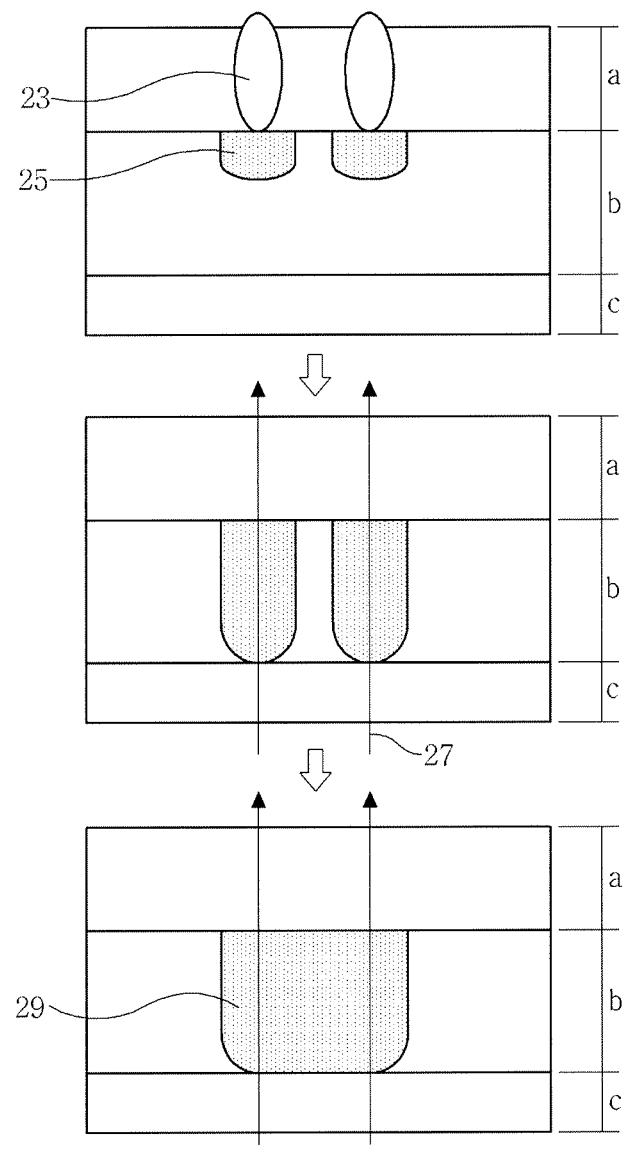
FIG. 2 is a reaction diagram illustrating a corrosion phenomenon of a typical pouch case.
Figure 3:
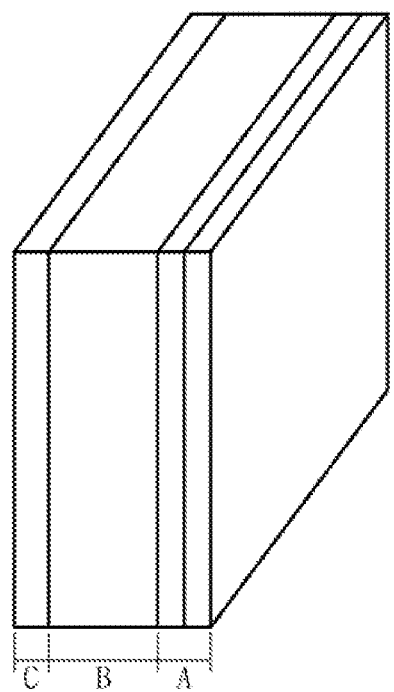
FIG. 3 is a cross-sectional view illustrating a pouch case composed of a multilayer structure of internal resin layer/intermediate resin layer/external resin layer according to an embodiment of the present invention.

As illustrated in FIG. 3, the pouch case of the battery according to an embodiment of the present invention is composed of an internal resin layer A acting as a sealant due to its heat sealability, an intermediate resin layer B acting as an insulating layer preventing side reactions by blocking moisture penetration and charge transfer, and an external resin layer C acting as a base material and a protective layer.

In this case, the internal and external resin layer may be a resin composite layer composed of at least one layer.

Specifically, in the pouch case of the present invention, the internal resin layer may include a single layer of one selected from the group consisting of casted polypropylene (CPP), a polypropylene-butylene-ethylene terpolymer, polypropylene, polyethylene, an ethylene-propylene copolymer, an ethylene-acrylic acid copolymer, and a propylene-acrylic acid copolymer, or a composite layer of two or more thereof.

In this case, a thickness of the internal resin layer may be in a range of 10 μm to 100 μm.

Also, in the pouch case of the present invention, the intermediate resin layer may include an acrylate-urethane-based resin or an epoxy-based resin.

Specifically, the acrylate-urethane-based resin may further include an acrylonitrile-based resin.

In this case, a thickness of the intermediate resin layer may be in a range of 60 μm to 100 μm.

In the pouch case of the present invention, a resin is melted or dissolved in a solvent to make a film, and the intermediate resin layer may then be formed by coating or laminating the internal resin layer with the film.

In this case, the solvent is not particularly limited so long as it may dissolve the resin.

Also, in the pouch case of the present invention, the external resin layer may include a single layer of one selected from the group consisting of polyethylene, polypropylene, polyethylene terephthalate, nylon, low density polyethylene (LDPE), high density polyethylene (HDPE), and linear low density polyethylene (LLDPE), or a composite layer of two or more thereof.

In this case, a thickness of the external resin layer may be in a range of 10 μm to 100 μm.

Also, in the present invention, provided is a pouch-type secondary battery including an electrode assembly; and the pouch case of the present invention accommodating the electrode assembly.

In this case, the assembly is formed in which an anode including an anode active material and a cathode including a cathode active material are insulated and wound while a separator is disposed therebetween.

Specifically, a cathode collector, for example, is coated with a mixture of a cathode active material, a conductive agent, and a binder, and the cathode is then prepared by drying the cathode collector. If necessary, a filler may be further added to the mixture.

The cathode active material according to the present invention may be used by mixing with a layered compound such as lithium cobalt oxide ($LiCoO_2$) and lithium nickel oxide ($LiNiO_2$), or a compound substituted with at least one transition metal; a lithium manganese oxide such as the chemical formula $Li_{1+x}Mn_{2-x}O_4$ (where x ranges from 0 to 0.33), $LiMnO_3$, $LiMn_2O_3$, and $LiMnO_2$; lithium copper oxide ($Li_2CuO_2$); vanadium oxide such as $LiV_3O_8$, $LiFe_3O_4$, $V_2O_5$, and $Cu_2V_2O_7$; lithiated nickel oxide represented by the chemical formula $LiNi_{1-x}M_xO_2$ (where M is cobalt (Co), manganese (Mn), aluminum (Al), copper (Cu), iron (Fe), magnesium (Mg), boron (B), or gallium (Ga), and x ranges from 0.01 to 0.3); lithium manganese complex oxide represented by the chemical formula $LiMn_{2-x}M_xO_2$ (where M is Co, nickel (Ni), Fe, chromium (Cr), zinc (Zn), or tantalum (Ta), and x ranges from 0.01 to 0.1) or $Li_2Mn_3MO_8$ (where M is Fe, Co, Ni, Cu, or Zn); $LiMn_2O_4$, with a part of lithium of a chemical formula being substituted with alkaline earth metal ions; a disulfide compound; and a compound having a lithium intercalation material as a main component such as $Fe_2(MoO_4)_3$ or a complex oxide formed in combination thereof.

In general, the cathode collector is fabricated to have a thickness of about 3 µm to about 500 µm. The cathode collector is not particularly limited so long as it has high conductivity without causing adverse chemical changes in the batteries. The cathode collector may be formed of, for example, stainless steel, aluminum, nickel, titanium, fired carbon, or aluminum or stainless steel that is surface-treated with one of carbon, nickel, titanium, silver, or the like. The collector may have an uneven surface to improve the bonding strength of a cathode active material and may have any of various shapes such as that of a film, a sheet, a foil, a net, a porous body, a foam body, a non-woven fabric body, and the like.

The conductive agent is commonly added in an amount of 1 wt % to 50 wt % based on a total weight of the mixture including the cathode active material. Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive oxide such as titanium oxide; or polyphenylene derivatives.

The binder is a component that assists in the binding between the active material and the conductive agent and in the binding with the collector. The binder is commonly added in an amount of 1 wt % to 50 wt % based on the total weight of the mixture including the cathode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene butadiene rubber, a fluoro rubber, various copolymers, and the like.

The filler is a component selectively used to inhibit the expansion of the anode. There is no particular limit to the filler, so long as it does not cause adverse chemical changes in the batteries and is a fibrous material. Examples of the filler may include olefin-based polymers such as polyethylene and polypropylene; and fibrous materials such as glass fibers and carbon fibers.

Also, the anode is prepared by coating an anode collector with an anode material and drying the anode collector. If necessary, the components previously described may be further included.

The anode collector is generally fabricated to have a thickness of about 3 µm to about 500 µm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength with an anode active material. The anode collector may have various shapes such as a film, a sheet, a foil, a net, a porous body, a foam body, a non-woven fabric body, and the like.

The anode material includes amorphous carbon or crystalline carbon, and specifically, may include carbon such as hard carbon and graphite-based carbon; a complex metal oxide such as $Li_xFe_2O_3$ ($0 \le x \le 1$), $Li_xWO_2$ ($0 \le x \le 1$), $Sn_xMe_{1-x}Me'_yO_z$ (Me: Mn, Fe, lead (Pb), or germanium (Ge); Me': Al, B, phosphorous (P), silicon (Si), Groups I, II and III elements, or halogen; $0 < x \le 1$; $1 \le y \le 3$; $1 \le z \le 8$); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; or a Li—Co—Ni-based material.

As the separator disposed between the cathode and the anode and insulating these electrodes, both a generally known polyolefin-based separator and a composite separator, in which an organic/inorganic composite layer is formed on an olefin-based base material, may be used, but the present invention is not limited thereto.

The electrode assembly having the above-described structure is accommodated in the pouch case and a battery is then prepared by injecting an electrolyte solution thereinto.

The electrolyte solution according to the present invention is a lithium salt-containing non-aqueous electrolyte that is formed of a non-aqueous electrolyte and lithium. A non-aqueous electrolyte solution, a organic solid electrolyte, or an inorganic solid electrolyte may be used as the non-aqueous electrolyte.

Examples of the non-aqueous electrolyte solution may be an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may be a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer containing an ionic dissociation group.

Examples of the inorganic solid electrolyte may be nitrides, halides, and sulfates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that readily soluble in the non-aqueous electrolyte and for example, may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Also, in order to improve charge/discharge characteristics and flame retardancy, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride, for example, may be added to the non-aqueous electrolyte. In some cases, halogen-containing solvents, such as carbon tetrachloride and ethylene trifluoride, may be further included in order to impart incombustibility, and carbon dioxide gas may be further included in order to improve high-temperature storage characteristics.

The pouch-type secondary battery may be a lithium secondary battery, but the present invention is not limited thereto.

The pouch-type secondary battery of the present invention may be used as a unit cell of a battery module, a power source of medium and large sized devices.

The invention claimed is:

1. A pouch case of a secondary battery, which is formed by stacking an internal resin layer, a single intermediate resin layer, and an external resin layer, wherein the single intermediate resin layer comprises an acrylate-urethane-based resin or an epoxy-based resin, and is directly coated on the internal resin layer.

2. The pouch case of claim 1, wherein the acrylate-urethane-based resin further comprises an acrylonitrile-based resin.

3. The pouch case of claim 1, wherein a thickness of the intermediate resin layer is in a range of 60 μm to 100 μm.

4. The pouch case of claim 1, wherein a resin is melted or dissolved in a solvent to make a film, and the intermediate resin layer is formed by coating or laminating the internal resin layer with the film.

5. The pouch case of claim 1, wherein the internal resin layer and the external resin layer are respectively resin composite layers composed of at least one layer.

6. The pouch case of claim 1, the internal resin layer comprises a single layer of one selected from the group consisting of casted polypropylene (CPP), a polypropylene-butylene-ethylene terpolymer, polypropylene, polyethylene, an ethylene-propylene copolymer, an ethylene-acrylic acid copolymer, and a propylene-acrylic acid copolymer, or a composite layer of two or more thereof.

7. The pouch case of claim 1, wherein a thickness of the internal resin layer is in a range of 10 μm to 100 μm.

8. The pouch case of claim 1, wherein the external resin layer comprises a single layer of one selected from the group consisting of polyethylene, polypropylene, polyethylene terephthalate, nylon, low density polyethylene (LDPE), high density polyethylene (HDPE), and linear low density polyethylene (LLDPE), or a composite layer of two or more thereof.

9. The pouch case of claim 1, wherein a thickness of the external resin layer is in a range of 10 μm to 100 μm.

10. A pouch-type secondary battery comprising:
an electrode assembly; and
the pouch case of claim 1 accommodating the electrode assembly.

11. The pouch-type secondary battery of claim 10, wherein the pouch-type secondary battery is used as a unit cell of a battery module, a power source of devices.

* * * * *